Feb. 17, 1970 L. A. STAPLES ET AL 3,496,563

CODE GENERATOR

Filed April 24, 1967 6 Sheets-Sheet 1

INVENTOR.
LYNN A. STAPLES
&
ALEXANDER J. URQUHART

BY William Grolman

INVENTOR.
LYNN A. STAPLES
ALEXANDER J. URQUHART

BY William Grolman

INVENTOR.
LYNN A. STAPLES
ALEXANDER J. URQUHART
BY William Grolman

CODE GENERATOR

Filed April 24, 1967 6 Sheets-Sheet 4

INVENTOR.
LYNN A. STAPLES
ALEXANDER J. URQUHART

BY William Grolman

CODE GENERATOR

Filed April 24, 1967 6 Sheets-Sheet 5

INVENTOR
LYNN A. STAPLES
ALEXANDER J. URQUHART
BY William Grolman

INVENTOR
LYNN A. STAPLES
ALEXANDER J. URQUHART

BY William Grolman

United States Patent Office 3,496,563

Patented Feb. 17, 1970

3,496,563
CODE GENERATOR

Lynn A. Staples, Green, and Alexander J. Urquhart, Binghamton, N.Y., assignors to Singer-General Precision, Inc., a corporation of Delaware Filed Apr. 24, 1967, Ser. No. 633,296
Int. Cl. G08c 19/16; H04l 15/34
U.S. Cl. 340—348 10 Claims

ABSTRACT OF THE DISCLOSURE

The device of this invention automatically generates pulse code representations of the letters of the standard Romanic alphabet and renders the code of each of the letters available for transmission at all times. In addition, this device includes selection switches so that any of the letter codes may be selected for transmission, and also a sequencing circuit which arranges the selected letter codes into a train of pulses representative of the code of a plurality of selected letters in series with suitable time between letters and between repeated transmissions. This generator includes electronic gates and switches operating together with binary counters to accomplish the timing results. An oscillator generates clock pulses of the proper duration. These clock pulses are then arranged by means of a binary counter and coincidence gates into a train of 13 pulses which follow each other in sequence, one pulse being applied to each output line. A matrix comprising a plurality of OR gates and inverters combines various ones of these 13 pulses into individual groups, each group representing an individual letter. Selector switches are also included so that any individual letter may be selected for transmission. In addition, a sequencing circuit which includes binary counters and coincidence gates and includes a feedback path organizes the selected groups of pulses into a single train which is transmitted as a single transmission. The feedback path permits the equipment to operate with proper time and spacing between letters regardless of the length of the individual letters being transmitted.

This invention relates to code generators and, more particularly, to generators for generating identification signals in pulse form in any selected code.

In the past automatic equipment for repetitively generating code identifications of a communications station or location have been used in many places. Just as one example, most airports incorporate navigational equipment which comprises ground-based radio transmitters. These transmitters transmit signals representative of the radial or angular relationship of any line from the transmitter with a line from the transmitter to the North Pole. Aircraft receiving these signals can identify which line, and therefore what the direction is, it is crossing with respect to that transmitter. In order to complete the navigational system, the location of the particular transmitter must also be made clear. To accomplish this, present installations utilize rotary mechanical switches driven by electric motors in which the contacts are so arranged that they generate the Morse code representative of the call letters of the particular station. This code representation of the call letters is used to modulate the transmitter so that a pilot receiving the signal from the airport also receives the Morse code identification of the airport. He can then determine where he is and the direction in which he is flying.

The present equipment described above is but one form of the similar equipment for automatically and repetitively generating such coded identification signals. As mentioned above, present-day devices generally comprise mechanical structures with all of the problems inherent in mechanical structures. Occasional surges due to electrical storms may cause the motor to burn out. The contacts are subject to arcing and pitting, and they, also, burn out. Vibrations may cause a contact to become loose or to drop out of the equipment altogether. Then, the code transmitted is incorrect. These are but some of the manifold problems inherent in the use of electro-mechanical equipment, particularly where the equipment is expected to operate through many, many cycles each day, and to operate for many, many years without attention.

It is an object of this invention to provide a new and improved pulse code generator.

It is another object of this invention to provide a new and improved code generator which does not utilize mechanical or rotating equipment.

It is a further object of this invention to provide a new and improved code generator which is completely electronic and extremely versatile.

It is still another object of this invention to provide a new and improved code generator constructed of solid-state electronic equipment giving high reliability and trouble-free operation over extended periods of time.

Other objects and advantages of this invention will become apparent as the following description proceeds, which description should be considered together with the accompanying drawings in which.

Figures 7A, 7B, 7C, 7D, 7E, 7F, 7G:
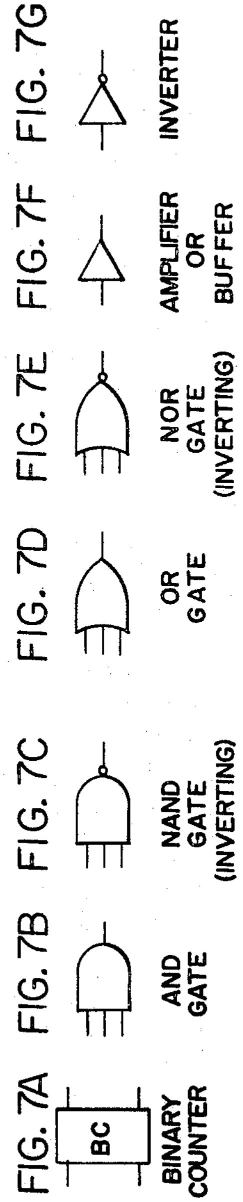
FIGS. 7A–7G are symbols identifying the components used in these drawings.

Referring to the drawings in detail, the several parts of FIG. 7 illustrate the symbols used in this specification. FIG. 7A is a rectangular block having two inputs and two outputs and bearing the identifying letters BC. This is the symbol used to represent a binary counter stage. A binary counter stage, as used in this specification, comprises a bistable device, such as a flip-flop, which is placed in alternate states by successive input pulses. Usually, the top input is the count input to which the pulses to be counted are applied. The other input is a reset input which always places the counter stage in the same condition, regardless of the condition it was in, when the reset input is energized. The two outputs are 0 and 1, and the counter stage is considered to be in the 0 state when the 0 output line has a high potential on it and is in the 1 state when the 1 line is high. FIG. 7B is the symbol of an AND gate. The one shown in FIG. 7B has three inputs and an output, but the actual gates used may have any number of inputs. When all of the inputs are high, then the output is also high. When any of the inputs is low, the output remains low. However, the AND gate can just as well be constructed to operate such that when inputs are low, the output is low. FIG. 7C represents a NAND gate. This is nothing more than an inverting AND gate. In this case, when all of the input lines are high, the gate produces an output which is low. Should any input be low, the output remains high. Also a NAND gate may operate such that when all inputs are low, the output is high. In the symbols as used in this specification, the lines with a small circle on them, such as the output from the NAND gate, represent a low potential when the circuit is operative. An OR gate is shown in FIG. 7D. In this case, three input lines and a single output line are shown although any number of inputs may actually be used. When any input line goes high, the output goes high. The NOR gate of FIG. 7E is an inverting OR gate and operates to produce a low potential on the single output line whenever any of the input lines goes high. The symbol in FIG. 7F is a typical amplifier symbol, and it is used in this specification to denote an amplifier or buffer. As shown in FIG. 7F, the amplifier is non-inverting, but as shown in FIG. 7G, the amplifier is inverting. Otherwise, the operation of the two amplifiers is the same. The symbols shown in FIGS. 7A–7G show standard components in which high inputs are used. However, if the circuit elements actually used permit or require it, the inputs could be low.

Figure 1:
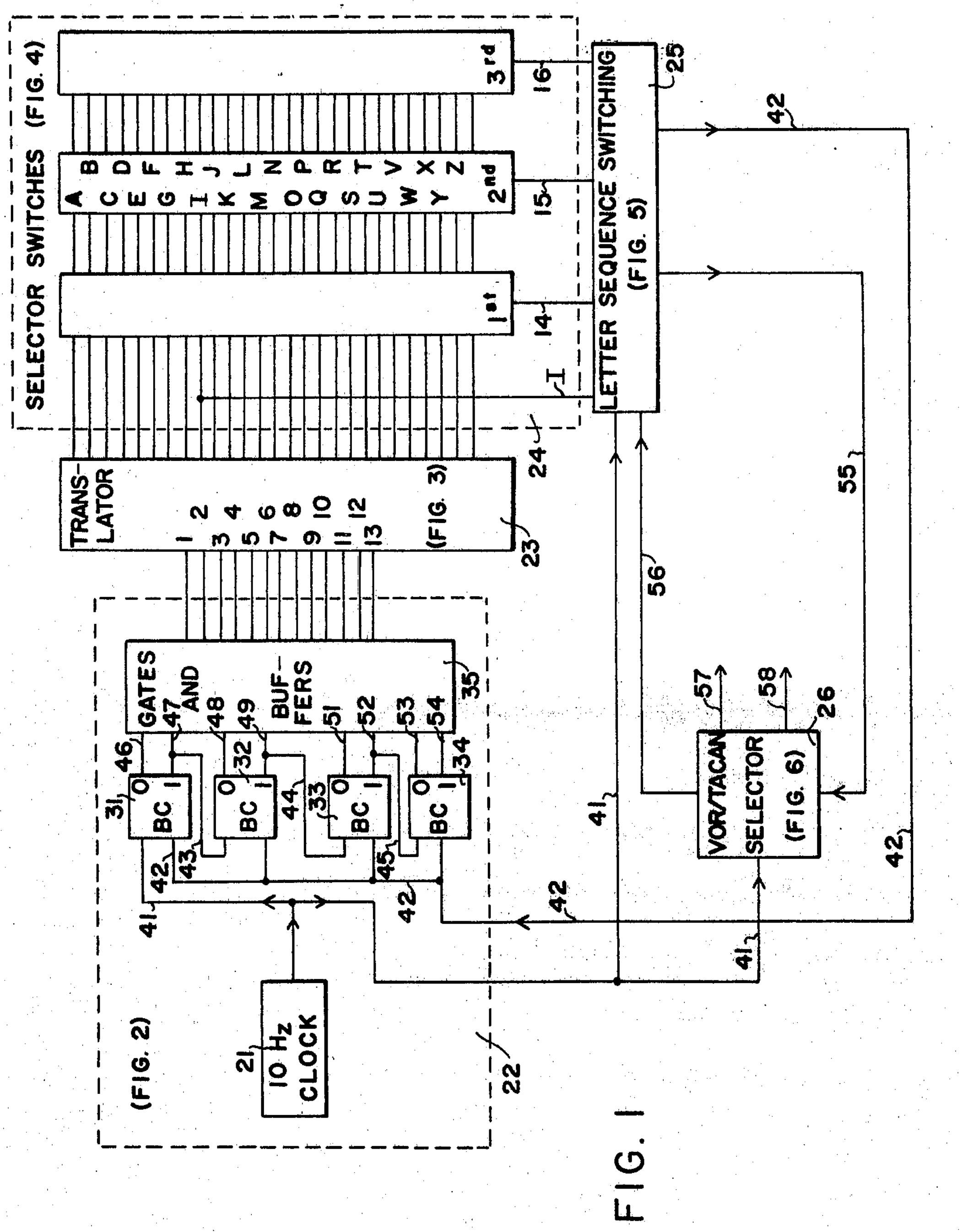
FIG. 1 is a block diagram of the system according to this invention.

Referring now to FIG. 1, the reference character 21 designates a ten cycle-per-second clock generator designated therein as a block. The clock generator 21 is contained in a larger block 22, shown in dashed lines, which comprises a ripple counter. The outputs from the ripple counter are connected into a translator 23 which converts the pulses applied to it into the appropriate code designation of the individual letters of the alphabet. These letter code designations are applied from the translator 23 to the selector switches 24. Shown in FIG. 1 are three selector switches (first, second and third), the individual outputs of which are applied together with the code designations of the letter "I" to the inputs of a letter sequence switching system 25. Connected in a feedback loop with the letter sequence switching system 25 is a selector 26 which transmits the output from the system.

The block 22 includes, in addition to the clock generator 21, a four-stage counter comprising individual binary counter stages 31, 32, 33 and 34. The output from the clock 21 is applied along a line 41 to the input of the binary counter stage 31 which, similar to all binary counters, has two inputs and two outputs. The second input to each of the binary counter stages 31–34 is a reset input which places all of the counter stages into an initial reset condition. The reset pulses are applied along a line 42 which connects into the second input of each stage. Each binary counter stage 31–34 has a 0 output and a 1 output, both of which are connected to the inputs of the gate and buffer system 35. In addition, the 1 output from the stage 31 is connected to the count input of the stage 32 by a line 43. The 1 output from stage 32 is connected to the count input of stage 33 along a line 44, and the 1 output from stage 33 is connected to the count input of stage 34 by a line 45. The 0 output from stage 31 is connected to the system 35 by a line 46 and the 1 output from that stage is connected into the system 35 by a line 47. The 0 output from the counter stage 32 is connected into the system 35 by a line 48 and the 1 output of stage 32 is connected into the system by a line

49. The 0 outputs of the stages 33 and 34 are applied to the system 35 by lines 51 and 53 respectively, and the 1 outputs of these two stages are applied to the system 35 by lines 52 and 54 respectively. The outputs from the gates and buffer system 35 are applied along lines designated 1 through 13, inclusive, to the inputs to the translator 23. Thus, the translator 23 has 13 separate inputs, and, since it provides a separate output for each letter of the alphabet, it has 26 outputs each designated by the letter of the output which it represents. The 26 output lines from the translator 23 are applied simultaneously to 26 separate inputs of each of three selector switches which are designated first, second and third. Each of the first, second and third switches has a single output line identified as 14, 15 and 16 respectively. These three lines (14, 15 and 16) together with a line representing the letter "I" are applied to the input of the letter sequence switching circuit 25. In addition, the sequence switching circuit 25 includes an input from the clock generator 21 and a second input along a line 56 from the selector circuit 26. Two outputs from the letter sequence switching device 25 are applied along line 42 to the reset inputs of the binary counter in the circuit of 22 and along a second line 55 to an input of the selector circuit 26. The outputs from the selector circuit 26 and from the system as a whole are along lines 57 and 58.

FIG. 1 is a general over-all block diagram of the system and is provided primarily to indicate the over-all organization of the system rather than to set forth any detailed circuitry. Necessarily, then, the explanation of the operation of the system shown in FIG. 1 must also be general. More detailed descriptions of the operations of the individual circuits and systems will be presented when the latter figures are described. In the over-all system, the clock generator 21 serves as the basic generator for the pulses which both time the operations within the system and also constitute the code elements themselves. Generally, the Morse code is so comprised that a dash is as long as three dots, the space between dashes and dots is equal to the length of one dot and the space between letters is equal to the time of three dots. From this it becomes clear that the dot is the basic element of the code. If all operations are synchronized to the timing of the dot, then a dash can be formed by three dots in series. A space between elements can be formed by removing a dot from a series, and the space between letters can be formed by removing three dots from a series. Actually, a slightly different method is used in this approach, but the basic philosophy is as stated.

The output from the clock generator 21 is applied into a four-element binary counter having stages 31, 32, 33 and 34. The four stages are cascaded and, as in the operation of any four-stage binary counter, the total number of possible outputs from this counter is 16. Of these 16 possible outputs, only 13 are used in this apparatus. The clock pulses from the generator 21 are applied along the line 41 to the count input of the first stage 31. Initially, all of the stages are set to the 0000 condition by an input pulse along line 42. When the first clock pulse is applied to the count input of the stage 31, that stage is placed into its 1 state. How the 0 and 1 states are represented is really immaterial to the invention. In each prior circuitry, the individual states were represented when that particular output line was high—had a high voltage. However, the use of transistors has sometimes dictated that the appropriate state be indicated when that designated line is low—has a low voltage. This depends on whether the individual circuit elements require a high voltage or a low voltage to cause them to operate so as to achieve the desired result. For this discussion, it is assumed that in the ripple counter 22, the binary counter is in its 0 state when the 0 line has a high potential, and the binary counter is in its 1 state when the 1 line has a high potential. Of course, when the 0 line is high, the 1 line is low; and vice versa. So, when the first clock pulse changes the stage of the binary counter stage 31, its 1 line goes high and the 0 lines of the other stages 32–34 are high. When the second pulse from the clock generator 21 is applied to line 41, the counter stage 31 is returned to its 0 state and an output pulse is applied from its 1 output line 47 along the line 43 to the count input of the stage 32. This drives the stage 32 into the 1 condition and now the line 49 of the stage 32 is high while the 0 lines 46, 51 and 53 of the other stages are low. The third input pulse to line 41 throws the counter stage 31 into the 1 state again, but does not affect anything else. At this point, the two 1 lines 47 and 49 are high and the 0 lines 51 and 53 are high. In this manner, the counter counts down through all of its 16 counts. Laying out the 16 counts generated by the counters 31–34 below, the pulse train combinations which are generated can be seen.

Binary Counters

| 34 | 33 | 32 | 31 |
|---|---|---|---|
| 0 | 0 | 0 | 0 |
| 0 | 0 | 0 | 1 |
| 0 | 0 | 1 | 0 |
| 0 | 0 | 1 | 1 |
| 0 | 1 | 0 | 0 |
| 0 | 1 | 0 | 1 |
| 0 | 1 | 1 | 0 |
| 0 | 1 | 1 | 1 |
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |
| 1 | 1 | 0 | 1 |
| 1 | 1 | 1 | 0 |
| 1 | 1 | 1 | 1 |

The individual pulses appear on each of the lines, and there are eight input lines to the gates and buffers. Each of the eight inputs has two separate states—high and low. As assumed above, if the high state represents a pulse, the low state will then represent no pulse. If the high state along any line can be considered the basis of a dot, then the low state along that line can be considered the absence of a dot. Thus, since the pulses and the absence of pulses on the individual lines occur at different times, they can be combined by suitable equipment to form trains of pulses and spaces to generate any code combination desired within the time period of a complete counter cycle, which in this case is 16 pulse times. In the system shown in FIG. 1, the clock generator 21 has been indicated as generating an output at the rate of ten cycles per second. This means that each pulse time is one-tenth of a second long, or a complete counter cycle occupies 1.6 seconds. This is slow operation for electronic equipment, but it is the purpose of this equipment to generate a code designation of a transmission which can be readily identified by persons, and this timing is fine for that purpose.

For generating the 26 letters of the alphabet, only 13 of the 16 possible counts from the counter stages 31–34 are required. For the purpose of this invention the last three counts are not used. The time intervals that these counts would occupy may serve a function so that the time does not go to waste. These 13 counts which are represented by their actual numbers 1–13 are applied in pulse form to the input to the translator 23 wherein they are combined in combinations of OR gates to form the actual Morse code for each of the 26 letters of the alphabet. Therefore, the translator 23 has 26 output lines, one line for each of the letters of the alphabet. The translator is so arranged that the code for each letter appears on its output at the same time that the code for all of the other letters appears on their respective outputs. Since, in the normal operation of a call letter identification system, the individual letters are not transmitted simultaneously but are, instead, transmitted in time sequence, it must be possible to select which of the 26 letters are to be used to identify any particular installation, and then transmit the code for these letters in the proper sequence. Assuming for this discussion that the identification for which this apparatus is to be used comprises only three letters, three selector switches are provided. All 26 letters are made available at the same time to the inputs of each of the three selector switches and the selector switches may be set to transmit to further apparatus the three letters which are chosen to identify the particular location. Taking, for example, call letters for an airport which may be BGN, the code transmission would be as follows: —... ——. —. Thus, the three letters out of the 26 letters which have been selected are B, G, and N, but they are not to be transmitted simultaneously. They are transmitted in sequence. To accomplish this, the outputs from each of the three selector switches (first, second and third) are applied to a sequence switching device 25. The sequence switching device is so arranged that it permits the letter appearing on the output from the first selector switch to be transmitted first, and then, after an appropriate pause, permits the letter appearing on the output from the second selector switch to be transmitted. This is continued for the third letter also. As can be seen from the code designation for the letters BGN as shown above, all letters do not occupy the same length of time. Each dash takes as much time as three dots, and the space between a dash or a dot is the same length of time as a dot. The letter B occupies the space of nine dots or 0.9 second, the letter G also occupies 0.9 second, but the letter N occupies only 0.5 second. For this reason the sequence switching device 25 must have means for permitting the transmission of one letter a suitable time after the end of the previous letter regardless of how long the previous letter may have taken. The output from the sequence switching device 25 comprises a timing line 42 for resetting the binary counter stages 31–34 to 0 and also includes the code representations of the three selected letters which are transmitted along the line 55 to the input of an output selector switch 26. The output selector switch 26 can be used to select the mode of transmission if this is a facility which is required by the generator; it can be used to feed a timing signal along line 56 to the letter sequence switching device 25 to indicate to the sequence switching device 25 when a particular type of transmission is being transmitted; and it can be used for similar operations. The actual output of the system is transmitted from the output selector switch 26 along the lines 57 and 58 if more than one mode of operation is desired.

The system shown in FIG. 1 is a sample system utilizing the principles of this invention. For example, three selector switches have been shown and this is all that is required for a typical airport call letter transmission. If, however, additional letters are to be transmitted, then additional selector switches will have to be provided and suitable modifications will be made in the sequence switching device 25. In addition, the output selector switch 26 has been shown where the mode of transmission may be variable and selectable. If a single type of transmission is required, then this circuit could, feasibly, be eliminated. However, the apparatus shown in block form in FIG. 1 is a generalized version of a system which utilizes the principles of this invention.

Figure 2:
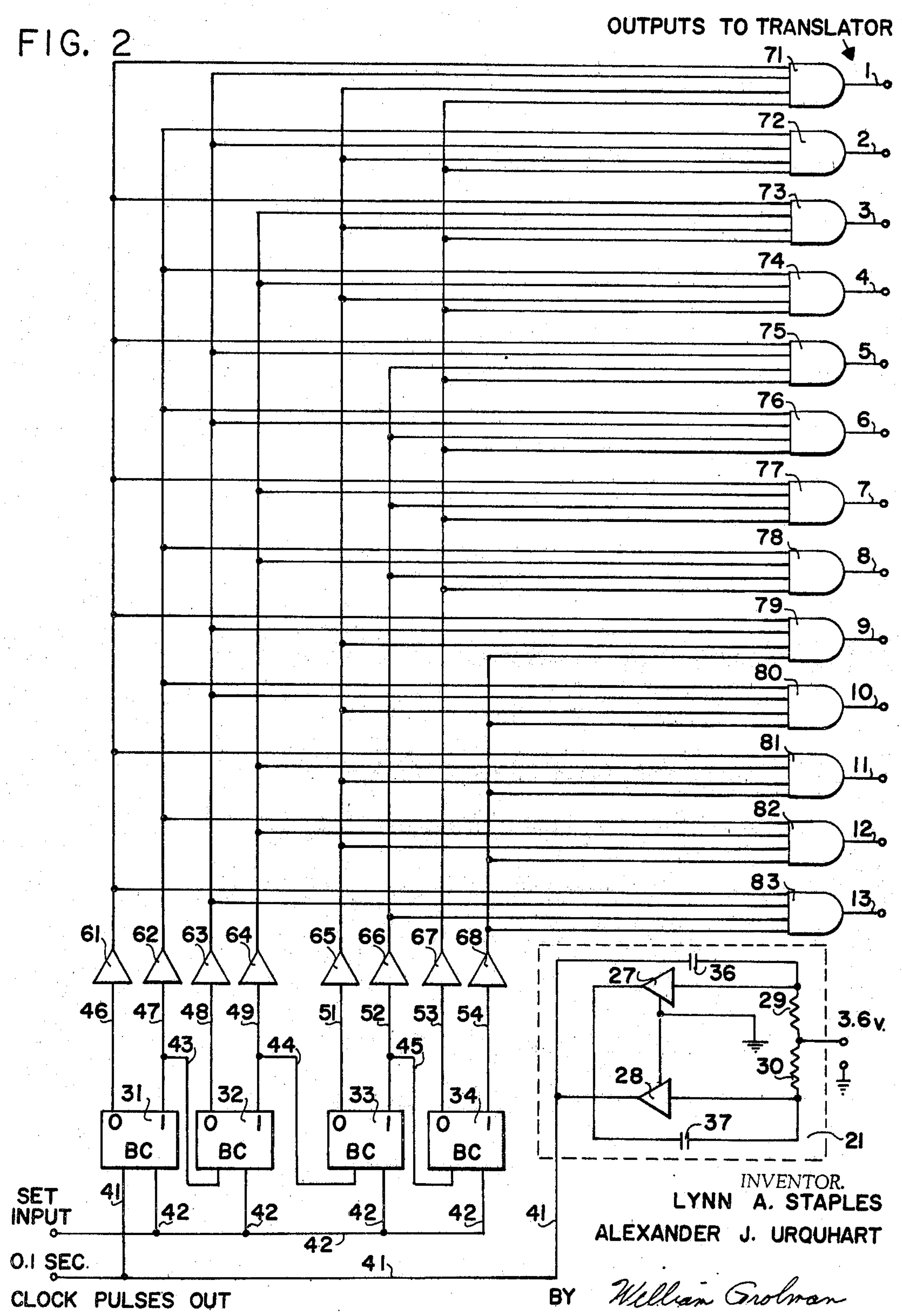
FIG. 2 is a detailed block diagram of the clock generator and ripple counter of the system of FIG. 1.

Referring to FIG. 2, the clock generator 21 and the ripple counter are shown in more detailed block form. The clock generator 21 comprises a pair of amplifier stages 27 and 28 which are cross-connected through appropriate capacitors 36 and 37 and resistors 29 and 30. Utilizing solid-state equipment, the amplifier stages 27 and 28 are shown having one side grounded, and the resistors 29 and 30 are shown connected in series, with the junction between the resistors connected to a source of positive potential. The capacitor 36 is connected between the output of the amplifier element 28 and the other end of the resistor 29, the junction between the resistor 29 and the capacitor 36 being connected to the input of the amplifier element 27. The capacitor 37 is connected between the output of the amplifier element 27 and the other end of the resistor 30, with the junction of the resistor 30 and the capacitor 37 being connected to the input to the amplifier element 28.

In operation, the clock generator operates as a standard multivibrator circuit. When a positive potential is applied at the input terminal, one or the other of the amplifier elements 27 or 28 becomes conductive. Which one conducts depends upon the inherent differences in impedances in the circuit. Assuming, for this discussion, that amplifier element 27 conducts, it charges capacitor 37. As the capacitor 37 charges, current flow through it decreases and the voltage drop due to that conduction through the resistor 30 decreases. Thus, conduction from the amplifier element 27 will continue only until the capacitor 37 is charged, so that further conduction therethrough is virtually impossible, or until the voltage drop across the resistor 30 decreases to the point where the input to the amplifier element 28 reaches a potential sufficient to cause it to conduct. When the amplifier element 28 conducts, it charges capacitor 36 through the resistor 29. Initially, as the capacitors 36 and 37 begin to charge, the current flow through them is large causing a large voltage drop across the charging resistors. Thus, as capacitor 36 begins to charge, the potential drop across the resistor 29 is greatest, reducing the potential at the input to the amplifier element 27 to a point below that required for it to conduct. As the capacitor 36 charges and the current flow through that capacitor decreases, the current flow through the resistor 29 also decreases and the voltage applied to the input of the amplifier element 27 increases. This continues until the output from the amplifier 28 drops off and the amplifier element 27 becomes conductive. Thus, as one of the elements 27 or 28 conducts, the other one is cut off. In this manner, the conduction switches from one element to the other and the output of the system comprises a plurality of pulses applied to the output line 41. The parameters of the system are selected so that the conduction through either of the elements 27 or 28 comprises the length of time which is desired, in this case one-tenth of a second.

The chain of output pulses from the output of the clock generator 21 is applied along the line 41 to the input to the binary counter stage 31. The binary counter stage 31 is shown with two outputs, the 0 output being connected through a line 46 to the input of a buffer 61, and the 1 output being connected along the line 47 to the input of a buffer 62 and also to the input of the counter stage 32. The 0 output from the counter stage 32 is connected through a line 48 to the input of a buffer 63, and the 1 output of the counter stage 32 is connected through a line 49 to the input of a buffer 64 and to the count input of the binary counter 33. The 0 output from binary counter 33 is connected through a line 51 to the input of a buffer 65, and the 1 output from the counter stage 33 is connected through a line 52 to the input of a buffer 66 and through a line 45 to the count input of a binary counter 34. The 0 output from the binary counter 34 is connected through a line 53 to a buffer 67, and the 1 output from the binary counter 34 is connected through a line 54 to the input of a buffer 68. The outputs from the various buffers 61, 62, 63, 64, 65, 66, 67 and 68 are connected in combinations of four each to the inputs of coincidence gates 71, 72, 73, 74, 75, 76, 77, 78, 79, 80, 81, 82 and 83. Rather than go through the detailed description of which outputs are connected to which gates, the connections of a few sample gates will be discussed below with an indication of how these inputs cooperate to produce the 13 output pulses which are applied as the inputs to the translator 23.

The purpose of the ripple counter and the gates of FIG. 2 is to generate a series of pulses in the proper timing. The outputs from the gates 71–83 should each be a single pulse in a single pulse time slot. Each pulse is 0.1 second wide, and it is joined on each side by its immediately adjacent neighbors. Thus, if any single line, take for example the output line from the gate 71, is monitored, the output will be a single pulse 0.1 second wide and then nothing for 1.5 seconds. This is the occurrence on each of the outputs with the time when the individual pulse on each line occurs being different from the time when each other pulse occurs. If all of the lines 1 through 13 were tied together and monitored, then a single pulse 1.3 seconds wide followed by an interval of no pulse 0.3 second wide would be observed. The outputs from the binary counters form four-digit numbers. The gates 71–83 convert those four-digit numbers into the single output pulses in the proper timing. Consider gate 71. The inputs to gate 71 are the 0 outputs from each of the binary counters 31–34. Thus, whenever all four binary counters are at zero (0000), then a single output pulse one-tenth of a second wide will pass through gate 71. Consider gate 79. One input to that gate is from the 0 output of binary counter 31, one input is from the 0 output of binary counter 32, one input is from the 0 output of binary counter 33, and the fourth input is from the 1 output of binary counter 34 (1000). At the time when this particular count is achieved by the counters 31–34, gate 79 is opened and a single pulse one-tenth of a second wide appears on line 9. Each of the gates 71–83 has a unique counting combination applied to its inputs from the binary counters 31–34 and the buffers 61–68. Since the count changes each tenth of a second and since the total number of counts is 16, then the time required for a complete count cycle is 1.6 seconds. However, only 13 gates are used and these are the count combinations from 0000 through 1100. These counts occupy 1.3 seconds leaving 0.3 second when no output pulses occur from the gates 71–83.

Since the timing of the dots and the dashes which form the code designations of the call letters is so important, it is desirable to use a single clock generator to generate the clock pulses and thus avoid the drift and loss of synchronization which often occurs when more than one generator is used. But, as mentioned above, a string of pulses each of the same time width and so spaced that one begins as the other ends is required. And, the output from a clock generator has pulses of two polarities. So if the output of a single clock generator were used, means must be found to fill in the spaces left by that half of the output which is of the wrong polarity. The combination of the counter and the gates shown in FIG. 2 accomplishes the purposes desired and provides the individual pulses with their own timing on separate individual lines so that they can be readily combined into a plurality of code combinations using only a single clock.

Figure 3:
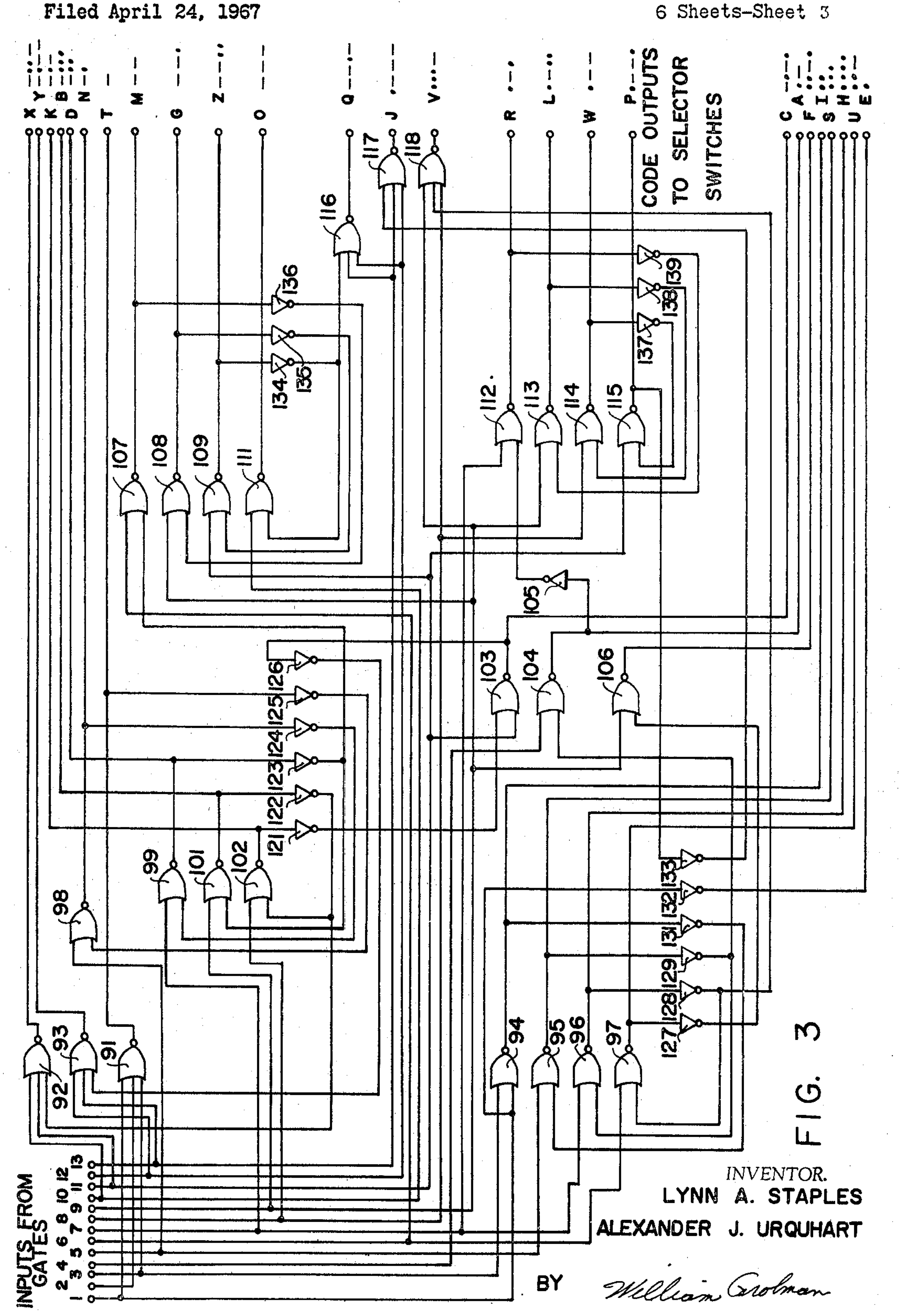
FIG. 3 is a detailed block diagram of the translator of the apparatus of FIG. 1.

FIG. 3 illustrates the translator of this system in detailed block form. The inputs to the translator of FIG. 3 are the 13 output lines from the gates 71–83 of FIG. 2. These 13 inputs appear in the upper left-hand corner of FIG. 3. The outputs from the translator of FIG. 3 appear as 26 lines ending in the terminals along the right-hand edge of the drawing. Each output terminal is identified by the letter and the code designation of that letter which that line represents. Connecting the 13 inputs to the 26 outputs is a plurality of NOR gates, and where required, inverting states. Each of the gates 91, 92, 93 94, 95, 96, 97, 98, 99, 101, 102, 103, 104, 106, 107, 108, 109, 111, 112, 113, 114, 115, 116, 117 and 118 is a NOR gate. This means that whenever one input is high, the output will be low. Actually, the code combinations which appear on the output terminals of the translator are the inverse of the actual code. That is, the pulses are negative-going pulses where normally they would be positive-going pulses. There are 26 output lines each of which represents a single code combination, and each of 25 of these lines is the output from a single one of the NOR gates mentioned above. The 26th output is derived from an inverter 132. These gates have two or three inputs which represent not only various combinations of the 13 input lines but also represent, in some cases, feedbacks from the output of one NOR gate to the input of another. The table in column 9 indicates

| NOR Gates | Inputs | | | Output |
| --- | --- | --- | --- | --- |
| 91 | Line 1 | Line 2 | Line 3 | T — & Inverter 125 |
| 92 | Line 10 | Inverter 122 | Line 11 | X — · · — |
| 93 | Line 12 | Inverter 126 | Line 13 | Y — · — — |
| 94 | Line 3 | Line 1 | | I · · & Inverter 131 |
| 95 | Line 5 | Inverter 131 | | S · · · & Inverter 129 |
| 96 | Line 7 | Inverter 129 | | H · · · · & Inverter 128 |
| 97 | Line 6 | Inverter 128 | | U · · — & Inverter 127 |
| 98 | Line 5 | Inverter 125 | | N — · & Inverter 124 |
| 99 | Line 7 | Inverter 124 | | D — · · & Inverter 123 |
| 101 | Line 9 | Inverter 123 | | B — · · · & Inverter 122 |
| 102 | Line 8 | Inverter 122 | | K — · — & Inverter 121 |
| 103 | Line 11 | Inverter 121 | | C — · — · & Inverter 126 |
| 104 | Line 4 | Inverter 129 | | A · — & Inverter 105 |
| 106 | Line 9 | Inverter 127 | | F · · — · |
| 107 | Line 6 | Inverter 123 | | M — — & Inverter 136 |
| 108 | Line 9 | Inverter 136 | | G — — · & Inverter 135 |
| 109 | Line 11 | Inverter 135 | | Z — — · · & Inverter 134 |
| 111 | Line 10 | Inverter 134 | | O — — — |
| 112 | Line 7 | Inverter 105 | | R · — · & Inverter 139 |
| 113 | Line 9 | Inverter 139 | | L · — · · & Inverter 138 |
| 114 | Line 8 | Inverter 138 | | W · — — & Inverter 137 |
| 115 | Line 11 | Inverter 137 | | P · — — · & Inverter 133 |
| 116 | Line 13 | Inverter 134 | Line 12 | Q — — · — |
| 117 | Line 13 | Inverter 133 | Line 12 | J · — — — |
| 118 | Line 9 | Inverter 128 | Line 8 | V · · · — |
| Inverter 132 | Line 1 | | | E · |

the inputs to each of the gates and their outputs in a simple and concise manner.

The accompanying table indicates the inputs and the outputs for each of the NOR gates in the translator and the manner in which the NOR gates 91–118 and the inverters 121–139 are interconnected. It also indicates the manner in which the apparatus operates. As mentioned above, the code for each letter is formed by the proper arrangement and occurrence of successive pulses. Referring to the table, consider gate 91 which has three inputs, one each from the lines 1, 2 and 3. Since the pulses on lines 1, 2 and 3 occur in immediate succession, the output from the gate 91 is a single pulse equal in length to three of the input pulses, or 0.3 second long. This is the letter "T" which is formed by a single dash. From FIG. 3 it can be seen that the output of the gate 91 is also applied to the input of the inverter 125, the output of which is applied as one input to the gate 98. As mentioned above, the gates are NOR gates and produce a low output for a high input. Thus, when the output of one gate is to be applied as the input to another gate, an inverter is used between the two to provide the proper polarity. The output of gate 91 is a dash. Therefore, one of the inputs to gate 98 is a dash, the letter "T." The dash from this inverter 125 ends at the end of time 3. The second input to gate 98 is from line 5. From these two inputs, the gate 98 produces an output which is a dash followed by an empty space of 0.1 second, followed by a dot, and this is the letter "N." Also, FIG. 3 shows that the output from gate 98 (the letter "N") is applied to the input of inverter 124, the output of which is applied as one input to gate 99. The other input to gate 99 is applied from line 7. That input to gate 99 which is applied through inverter 124 is the output of gate 98 and comprises a dash, a space and a dot. The dot occurs at time 5. The next input to gate 99 occurs at time 7. Thus, the output of gate 99 comprises a dash, a space, a dot, a space and a dot, or the letter "D." This demonstrates how the code combinations for various letters can be constructed from basic, previously formed code combinations. The code for "N" started as the letter "T." The code for the letter "D" started from the letter "N." In the same manner, the letter "B" is formed by the letter "D" with another dot added. In addition, these examples illustrate how the pulses on successive lines can be utilized to form a train of pulses, some longer than other, which represents a code combination of a particular letter. The letter "E" which appears as a single dot in Morse code is provided not by the output of a NOR gate, but rather by the output of an inverter 132. The letter "E" is formed by the single pulse on line 1. Since line 1 contains the earliest pulse, the pulses on this line can also be used as the basis for subsequent letters. Line 1 is applied, for example, as an input to gate 94 which receives a second input from line 3. Thus, the letter output from gate 94 is the letter "I," two dots, one occurring at time 1 and one occurring at time 3. These two dots are also applied to inverter 131, and thereby as an input to gate 95 which also receives a pulse from line 5. Thus, the output from gate 95 now comprises three spaced dots. This procedures can be used to generate any code combinations required to represent any letter of the alphabet. The letters "Y," "J" and "Q" each requires a full 13 pulse times or 1.3 seconds.

Figure 4:
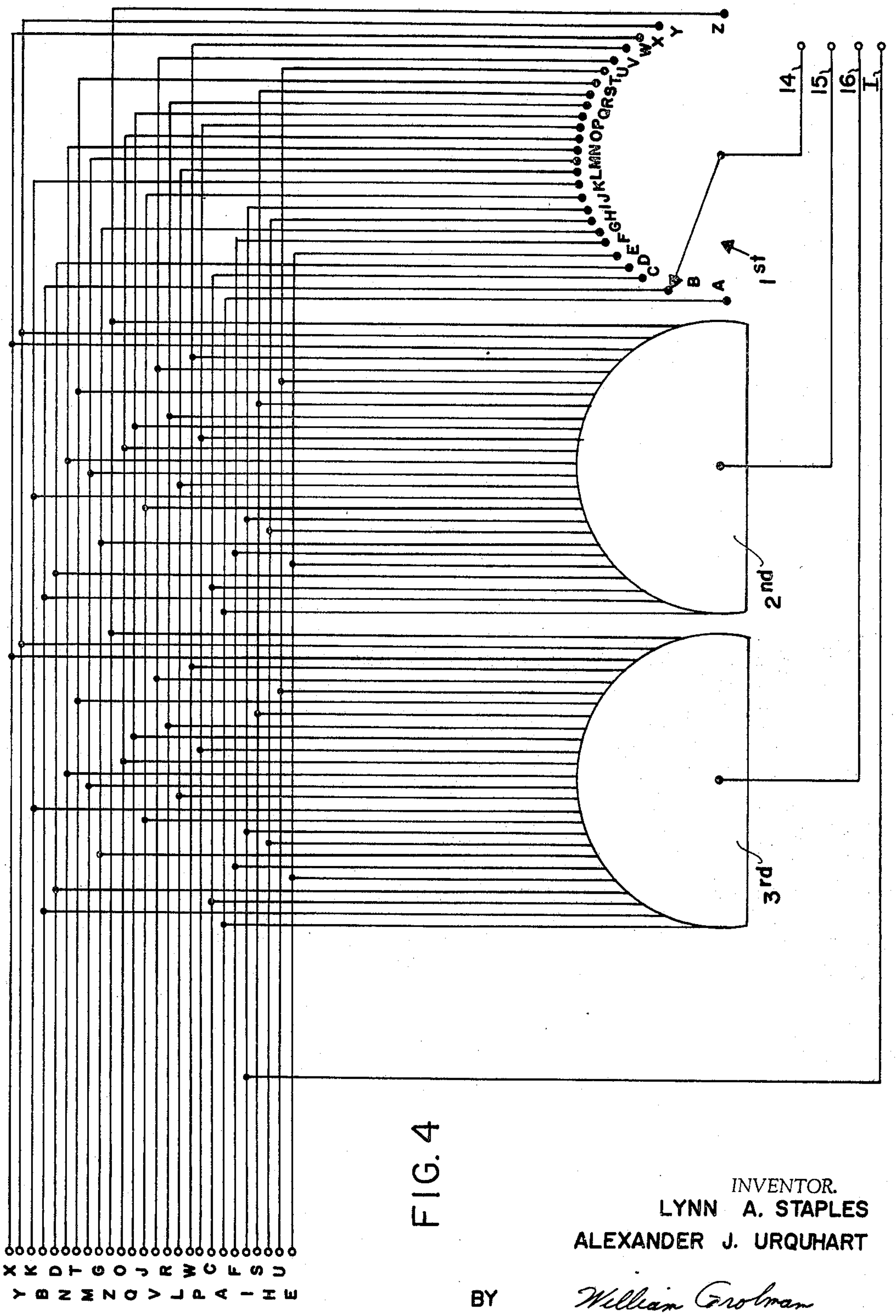
FIG. 4 is a schematic wiring diagram of three selector switches as used in the system of FIG. 1.

The translator shown in FIG. 3 provides on its 26 output lines the Morse code for the 26 letters of the alphabet. Now that this information has been derived, it must be used. In most utilization, information of this type is seldom used a letter at any time. If this were the case, it would be cheaper to provide individual code generators for generating the particular code combinations for the particular letter desired. However, this device provides the code combinations for all 26 letters of the alphabet and renders them all available at the same time. In order to utilize this information, since the various code combinations are available at the same time, means must be provided to select which individiual letter or which combination of letters is desirable for any particular purpose. The selector switches shown in FIG. 4 are included for this purpose. Three selector switches have been shown and they have been designated first, second and third. Only the first selector switch is shown in detail. This selector switch includes a single central movable contact and 26 stationary contacts arranged in an arc so that the movable centrally located contact arm can sweep all 26 stationary contacts. Each of the stationary contacts is connected to an individual one of the lines upon which the letter codes appear. These lines are shown in the upper left-hand portion of the drawing and are labeled in the same manner as the lines on the right side of FIG. 3. Three selector switches are shown in FIG. 4 and these selector switches are connected in parallel so that each switch may be placed to a particular position and the code of that selected letter will appear at the output terminal from the central movable contact. Any number of similar switches may be used and any type of selector switch which will accomplish the same purpose may be used. Switches shown in FIG. 4 are for illustrative purposes only and are not considered to be restrictive. If desired, instead of selector switches of this type, a permanent connection may be made from the particular code-bearing line to a selected output terminal so that that output terminal permanently carries the selected code combination. Or, each code line may contain its own single-pole, single-throw switch and all of the lines may be connected together to common output terminals. In this situation, only the code whose line switch has been closed will appear at the output terminal. However, for simplicity, economy and versatility, the rotary selector switches shown in FIG. 4 are considered to be particularly advantageous. In some instances, an additional letter code for a single letter is required for special purposes. In FIG. 4 this is shown as a direct connection to the line carrying the code for the letter "I." Therefore, in the manner shown in FIG. 4, only individual letters of the 26 generated by the translator appear at each of the four output terminals 14, 15, 16 and "I."

Figure 5:
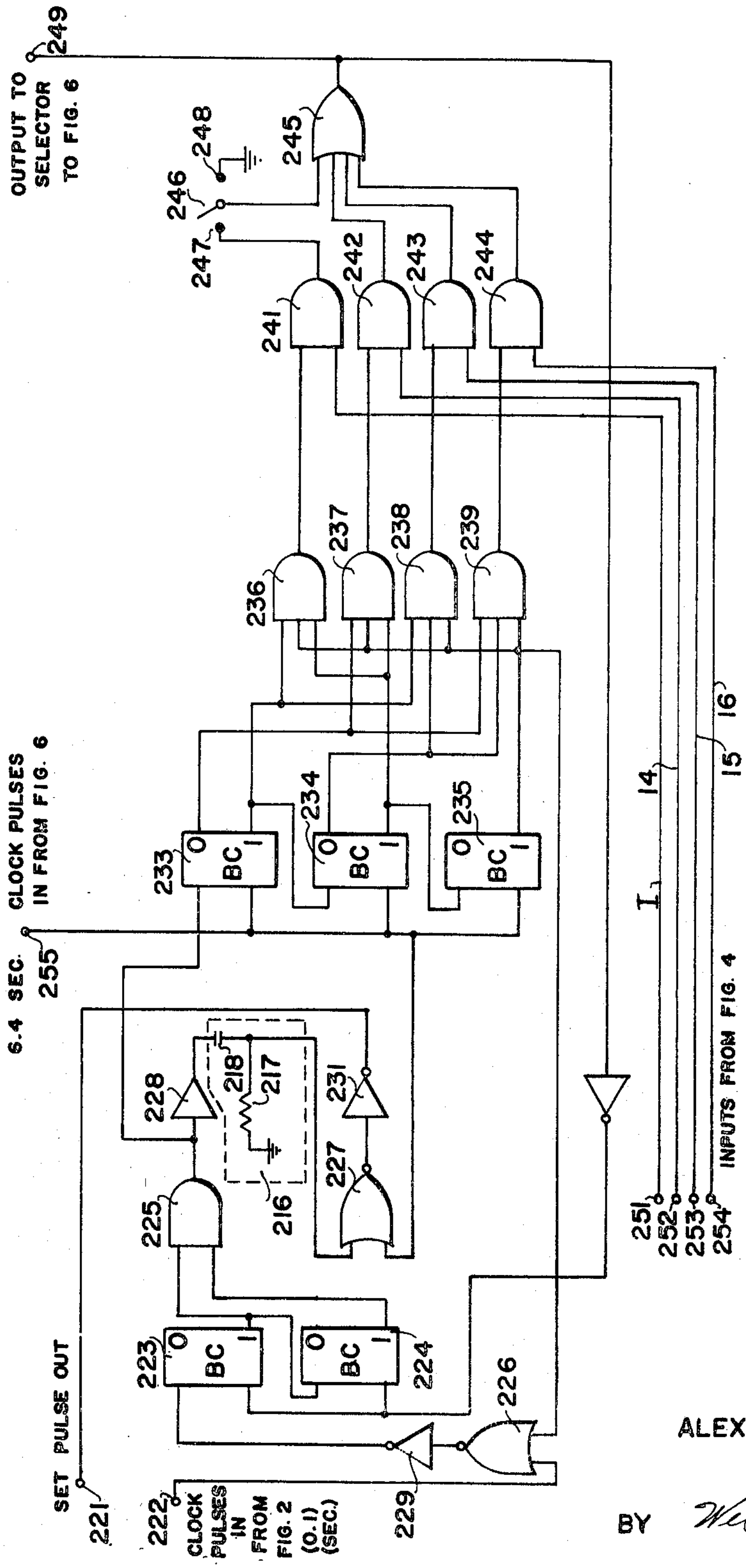
FIG. 5 is a detailed block diagram of automatic letter sequence switching equipment used in the system of FIG. 1.

The letter sequence switching device is illustrated in FIG. 5 in detailed block form. The four lines 14, 15, 16 and "I" from the output of the selector switches shown in FIG. 4 are connected to the input terminals 251, 252, 253 and 254 of FIG. 5. For the sake of simplicity, these lines will carry the same designations that they do in FIG. 4. Each of these lines is applied to a gate as one of two inputs thereof. The four sequence switching gates are 241, 242, 243 and 244. The "I" line is applied as an input to gate 241; line 14 supplies an input to gate 242; line 15 is connected to gate 243; and line 16 supplies gate 244. Each of the gates 241–244 has a second input which is required to be energized before an output signal is generated. These second inputs are applied to the gates 241–244 from a sequence timer. The sequence timer is shown in FIG. 5 and comprises an input terminal 222 to which clock pulses (0.1 second) from the clock generator of FIG. 2 are applied. The clock pulses are applied as an input to a NOR gate 226, the output of which is applied through an inverter 229 to the count input of a binary counter stage 223. The 1 output of the binary counter stage 223 is applied to the 0 input to a second binary counter stage 224. The 0 outputs of the two counter stages 223 and 224 are applied to the two inputs of a coincidence gate 225. The output from the gate 225 is applied to the count input of a binary counter stage 233 which is the first in a chain of three binary counter stages including binary counter 234 and binary counter 235. In addition, the output from the gate 225 is used to generate the set pulses which reset the ripple counter shown in FIGS. 1 and 2. The output from the gate 225 is applied through an inverter 228 and to a differentiator 216. The differentiator 216 comprises a resistor 217 having one end connected to ground and a capacitor 218. One end of the capacitor 218 is connected to the output from the inverter 228 and the other end is connected to the input of a NOR gate 227. The other end of the resistor 217 is connected to the junction of the capacitor 218 and the input to the gate 227. The output from the NOR gate 227 is applied through an inverter 231 to the set pulse output terminal 221.

Returning to the binary counter stage 233, the 1 output of this stage is connected to the count input of binary counter stage 234, and the 1 output from the stage 234 is applied to the count input of stage 235 to provide a binary counting chain. Four coincidence gates 236, 237, 238 and 239 each having three inputs receive the outputs from the binary counter stages 233, 234 and 235. The 0 output from binary counter 233 is applied as one input to each of gates 237 and 239. The 0 output from gate 234 is applied as one input to each of the two gates 238 and 239. The 1 output from binary counter stage 233 is applied as an input to each of the gates 236 and 238. The 1 output from binary counter 234 is applied as an input to each of the gates 236 and 237. The 0 output from stage 235 is not used and the 1 output is applied as an input to each of the gates 236–239 and also as a second input to the NOR gate 226. The outputs of the gates 236–239 are individually applied as second inputs to sequence switching gates 231–234 respectively. The output from the gate 241 is applied to a contact 247 of a switch 246, another contact 248 of which is grounded. The movable contact of the switch 246 is applied as one input to an OR gate 245 and the individual outputs from the gates 242, 243 and 244 are applied as the other inputs to the OR gate 245. The output of the OR gate 245 is applied to an output terminal 249 which serves as a selector input to the selector switching circuit shown in FIG. 6. An input terminal 255 receives clock pulses which occur every 6.4 seconds from the selector circuit shown in FIG. 6. The terminal 255 is connected to the reest inputs of the binary counter stages 233, 234 and 235 and is also applied as another input to the NOR gate 227. When the code generator of this invention is used to identify airport navigation transmitters, this 6.4 second cycle renders this system a direct substitute for those presently in use.

The time interval required by the individual code representations of the various letters of the alphabet are not all the same. For example, the letter "E" comprises but a single dot and occupies, in this system, 0.1 second. On the other hand, the letter "O" comprises three dashes each of which is 0.3 second long and includes two spaces 0.1 second long between adjacent dashes occupying a total of 1.1 seconds. To properly serve as a Morse code generator which will generate and transmit a plurality of letters in code in normal timing, it is impossible to utilize time slots of equal width for each letter. It is the purpose of the circuitry shown in FIG. 5, the letter sequence switching device, to cause the letters to follow each other with the proper time intervals between letters regardless of the length of time each letter must occupy. To accomplish this, the two-stage binary counter comprising the stages 223 and 224 has applied to it the input pulses from the clock generator shown in FIG. 2. This binary counter also has applied to it the output from the OR gate 245 as reset pulses. So long as there is an output signal from gate 245 applied to the two reset inputs of the stages 223 and 224, those stages remain in their reset condition which produces outputs 00. Signals on these two lines are applied to the inputs to the gate 225 causing that gate to produce a low output signal which is applied to the input of the three-stage binary counter comprising the stages 233–235 and has no effect thereupon. The outputs from the stages 233–235 are applied in various combinations to the inputs of the gates 236–239. This produces a different output from these gates for each unique combination of counts from the three-stage binary counter 233–235. Thus, when the three counter stages 233–235 produce the output combination 001, then gate 239 produces an output signal which is applied to the output gate 244. When the gates 233–235 respectively generate a signal 101, then gate 238 produces an output; when the gates 233–235 produce an output 011, gate 237 is opened; and when the counter generates 111, gates 236 applies an input to gate 241. As mentioned above, one input to each of the gates 241–244 is the encoded letter which appears on the lines 14, 15, 16 and "I," and when the other input of any of the gates is energized, then this particular code combination is passed through that gate to the output OR gate 245 and to the output terminal 249, as well as back to the reset input of the binary counters 223 and 224. Working backward, it is the count or the state of the binary counters 233, 234 and 235 which determine which of the four gates 236–239 produces an output and which of the output gates 241–244 is opened. The particular condition of the counters 233, 234 and 235 depends upon the pulses passing through the gate 225. A pulse passes through the gate 225 only when the two-stage binary counters 223 and 224 are set to 11. Therefore, the critical operation in this particular circuit is the operation of the two-stage binary counter 223 and 224.

Assuming for this discussion that gate 239 is open and the letter to which the third selector switch of FIG. 4 is set is passing through the gate 244, then every time a pulse representative of a dot time appears in the letter being transmitted through the gate 244 passes through the OR gate 245 and appears at the reset line of the binary counters 223 and 224, those two counter stages are reset to 00. If, at the same time, a clock pulse is applied to the terminal 222 and passes through the NOR gate 226 and the inverter 229 to the input of the binary counter 223, it has no effect upon that counter. When there is a space or an interval between the occurrence of pulses at the output of the gate 245, then a clock pulse applied to the input terminal 222 will cause the counter stage 223 to shift to its 1 state. So long as a pulse again occurs on the output from gate 245, the binary counters 223 and 224 will be reset to their 0 condition. And the rest of the sequence switching system remains the way it was. However, at the end of the transmission of the letter code coming from gate 244 through the gate 245, the clock pulses applied to input terminal 222 drive the counter 223 into its 1 state, then back into its 0 state, driving the counter stage 224 into its 1 state. When three clock pulses have been applied to the input terminal 222 and the counters 223 and 224 have been driven through three counts, they are in their 11 states, again opening the gate 225 and applying a pulse input to the binary counter 233. This changes the state of binary counter 233 to its 1 condition, closing the gate 239 and gate 244 and opening gate 238. This, in turn, opens gate 243 and permits the code representation appearing on the line 15 from the selector switch of FIG. 4 to be applied through the gate 243 and the gate 245 to the output terminal 249, resetting counters 223 and 224 to the 00 states. This operation then continues in the same manner as when the code combination on line 16 was being transmitted. At the end of the transmission of a letter, the binary counter 223–224 passes through three counts. On the third count, the binary counter 223 and 224 is placed in its 11 condition, the counter 233–235 is driven into another count, and a subsequent gate 236–239 is opened to permit another line from the selector switch to be connected to the output. In this manner, the feedback from the output of the sequence counter controls the resetting of the counter 233 and 234 to prevent the stepping of the sequence counter 233–235 until a letter has been completely transmitted regardless of the time interval it requires.

Figure 6:
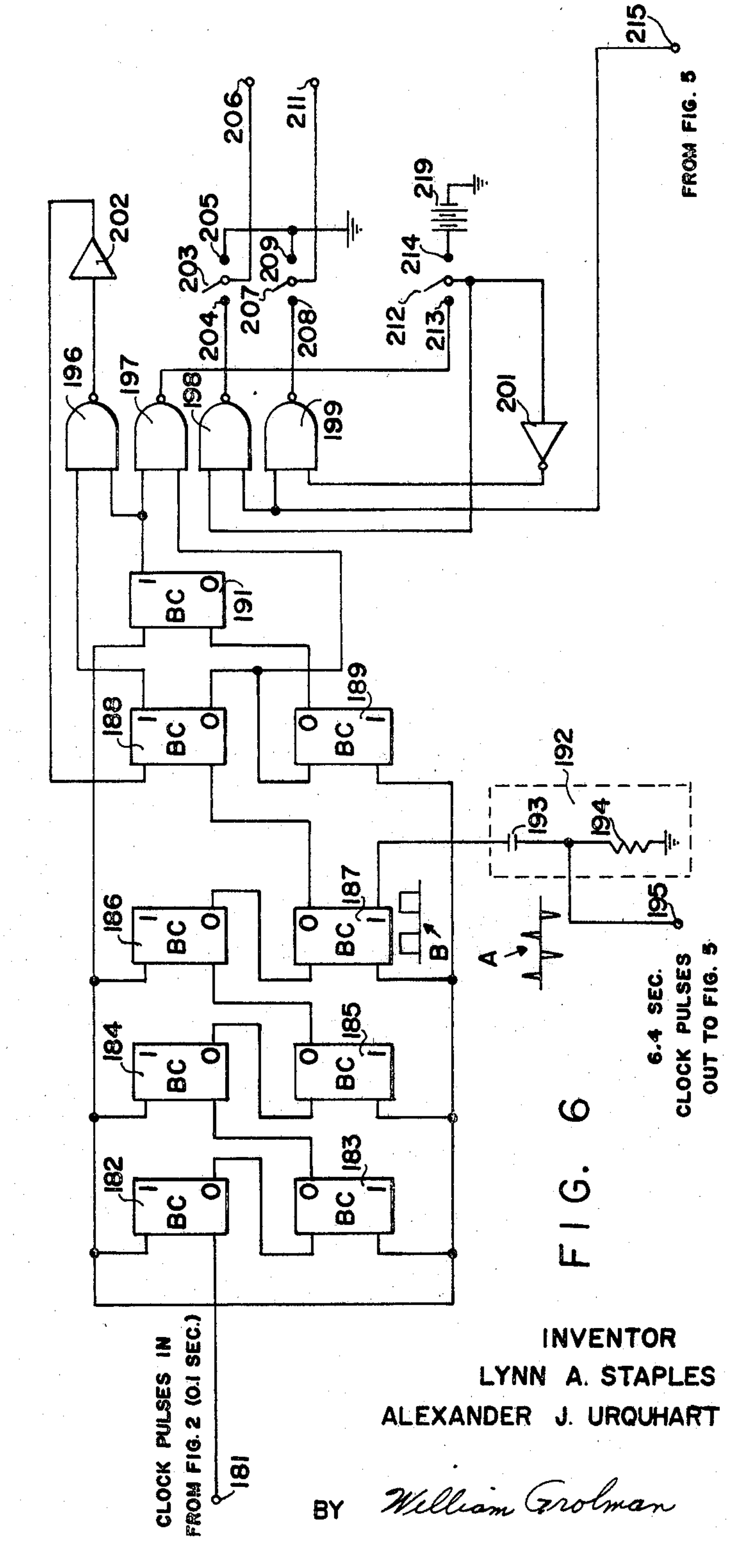
FIG. 6 is a detailed block diagram of one automatic selector switching circuit used with the system of FIG. 1.

The output selector of FIG. 6 comprises two separate parts: one is the selector switching portion of it and the other is a timer portion. The timer portion comprises a chain of nine binary counters 182, 183, 184, 185, 186, 187, 188, 189 and 191. Input pulses are applied from the clock generator shown in FIG. 2 to the input terminal 181 which is connected to the count input of the binary counter 182. The single output from the counter 182 is applied to the count input of 183 whose single output is applied to the count input of 184. This continues in the same fashion connecting counters 184 to 185, 185 to 186, 186 to 187, 187 to 188, 188 to 189, and 189 to 191. In addition, however, counters 187, 188 and 189 each have two outputs which are used. The 0 input to each stage is the count input, and the 0 output from each of the stages passes the count on to the following stage. The binary counter 187 has its 1 output connected to a differentiator 192 which comprises a capacitor 193 connected in series with a resistor 194, one end of which is grounded. The output terminal 195 is connected to the junction of the capacitor 193 and the resistor 194. The 1 output from the binary counter 188 is applied to a gate 196, the other input to which is the 1 output of the counter 191. The 0 output of counter 188, in addition to being connected as the input to counter 189, also supplies one input to a gate 197, the other input to which is from the 1 output of gate 191. The output of the gate 196 is connected to an inverter 202, the output of which supplies reset pulses for all of the binary counters 182–191. The output from the gate 197 is applied to one contact 213 of a double-throw switch 212, the other contact 214 of which is grounded. The movable contact of the switch 212 is connected as one input to a gate 198 and also through an inverter 201 as one input to a gate 199. The second input to gates 198 and 199 is supplied from an input terminal 215 which is connected to the output terminal 249 of FIG. 5. Thus, the code output from the OR gate 245 of FIG. 5 is applied to the input terminal 215 of FIG. 6. The output of gate 198 is connected to one contact 204 of a double-throw switch 203 which has a second contact 205 which is grounded. The output of the gate 199 is connected to one contact 208 of a double-throw switch 207 which also includes a second terminal 209 which is grounded. The movable terminal of the switch 203 is connected to one output terminal 206 and the movable portion of the switch 207 is connected to a second output terminal 211. The output terminals 206 and 211 are the code output terminals for the entire system.

The clock pulses applied to the input terminal 181 are the 0.1 second pulse outputs from the clock generator of FIG. 2 and are applied to the input to counter 182. Each time counter 182 receives an input pulse from the terminal 181 it changes its condition. And for every other change in its condition, it generates an output pulse which is applied to the input of counter 183. For each input pulse which counter 183 receives, it changes its condition, and every other time it changes its condition, it generates an output pulse which is applied to the input of counter 184. This operation continues through the counters 185, 186, 187, 188, 189 and 191. In this manner, counter 183 changes its condition every 0.2 second; and 184 every 0.4 second; and 185 every 0.8 second; and 186 every 1.6 seconds; and 187 every 3.2 seconds. Therefore, from the 1 output of binary counter 187, there appears, applied to the differentiator 192, a series of pulses which occur every 3.2 seconds. The differentiator 192 generates a very short sharp pulse each time a pulse applied to it changes its direction. This is illustrated by the two wave forms B and A. The two rectangular pulses shown in wave form B give rise to the four sharp pulses shown in wave form A. These sharp pulses are applied to the output terminal 195. Since in the subsequent equipment the negative pulses have no effect, the output at terminal 195 comprises sharp pulses which are separated by 6.4 seconds. These pulses are applied to input terminal 255 in FIG. 5 and serve to reset the binary counters 233–235 every 6.4 seconds. In addition, these pulses pass through the NOR gate 227 and the inverter 231 and by means of the output terminal 221 are applied to the set input terminal of FIG. 2 to reset the binary counters 31–34 every 6.4 seconds. Thus, every 6.4 seconds the entire operation begins anew. Thus, the binary counters 182–187 comprise a timer. The output from the counter 187 occurs every 3.2 seconds and the output from the counter 188 occurs every 6.4 seconds. Following this through, the output from the counter 189 occurs every 12.8 seconds and the output from the counter 191 occurs every 25.6 seconds. When the two counters 188 and 191 are both in the 1 state, the gate 196 is opened to pass a pulse through the inverter 202. This pulse is applied to the reset line to the binary counters 182–191 to reset them. This occurs every 32 seconds. In addition, when the counter 191 is in the 1 state and the counter 188 is in the 0 state, gate 197 is opened to pass a signal to the contact 213 of the switch 212. Should the switch 212 be in the appropriate position, the signal output of the gate 197 will be applied as an input to gate 198 and will pass through the inverter 201 and be applied as an input signal to the gate 199. The outputs from the gates 196 and 197 are generated at intervals of 25.6 seconds. Every 32 seconds, a set pulse from the output of the gate 196 is fed back to all of the counter stages 182–191 to reset those counters. Every 25.6 seconds, the output signal from gate 197 is applied to the contact 213 of the switch 212 for 6.4 seconds. The other contact 214 of the switch 212 is connected to the positive side of a source 219 of electrical energy, the other side of which is grounded.

The switch 203 is in the "on" position when it is to the left, making contact with the contact 204, and it is "off" when it is to the right and grounded. When the switch 203 is on, then the code combinations of the selected letters are transmitted through the gate 198 whenever the switch 214 is connected to the source 219. With the switch 214 to the right, the high voltage from the source 219 biases the gate 198 open to permit the letter codes through. Then, the selected letter codes pass through the gate 198 to the output terminal 206. Since the inverter 201 produces a low output for a high input, so long as the switch 212 is to the right, gate 199 is closed by the low output from the inverter 201. Should the switch 212 be placed in the left condition, in contact with the contact 213, then the output from the gate 197 will determine the output from the system. In the left condition of the switch 212, the normal high output from the gate 197 will be applied to the input of the gate 198 to open that gate. At the same time, the normal high output from the gate 197 will be applied through the inverter 201 as a low input to the gate 199 to close that gate. Assuming that the switches 203 and 207 are in their on conditions, to the left, then the selected letter codes will pass through the gate 198 to the output terminal 206 so long as no signal passes through gate 197. Once every 25.6 seconds, however, gate 197 will pass a signal which will last for 6.4 seconds, or until binary counter 188 changes its condition. This output from gate 197 will be low, closing gate 198 to which it is directly applied, and opening gate 199 to which it is applied as a high signal through the inverter 201. During this 6.4 seconds, the selected letter codes will past through gate 199 to the output terminal 211. Thus, with the apparatus shown in FIG. 6, depending upon the conditions of the selector switches 203, 207 and 212, the selected letter codes can be passed through gate 198 continuously to the output terminal 206, the selected letter codes can be passed through gate 198 for 25.6 seconds and then automatically through gate 199 for 6.4 seconds, or the selected letter codes can be passed through gate 199 for 6.4 seconds once each 25.6 seconds with no output at all from gate 198. Since the gates 198 and 199 supply separate output terminals 206 and 211, the output from the system can be used in any of several ways. Of course, the times set forth above are only exemplary. The counter stages 182–191 can be modified and otherwise connected to produce any desirable combination of times without departing from this invention. In addition to the above selections in the mode of transmission, it is possible to add the permanently connected letter, in this case the letter "I," into the code being transmitted, or delete it entirely by selecting the position of the switch 246 in FIG. 5. If switch 246 is in its left condition, then the letter "I" will be transmitted at the beginning of each code sequence. If the switch 246 is in its right condition, then the letter "I" will not be transmitted at all. In this manner, the entire combination is rendered more versatile by permitting the manual selection of any of several different modes of operation. If desired, the switches 203, 207, 212 and 246 may be eliminated and the connections represented by them can be permanently made.

What is claimed is:

1. An automatic system for generating pulse code combinations representative of alphabetic and other symbolic information, said system comprising a single clock generator for generating electrical pulses at a prescribed rate, a first counter, means for driving said first counter by the clock pulses generated by said generator, gate means connected to the outputs of said first counter to pass clock pulses in sequence at the clock rate, means for combining the pulses passed through said gate means in combinations of pulses of one and more pulse lengths to form code combinations of pulses of varying lengths to represent the desired information, code timing means, said code timing means comprising a second counter and a third counter, means for applying clock pulses from said generator to said second counter, a plurality of output gates, means for connecting the outputs of said third counter to said output gates to switch the opening of said gates in sequence as said third counter is driven through its count, means for applying selected code combinations developed by said combining means to the inputs of said output gates, means for driving said third counter from the full count output of said second counter, said second counter having a reset means which overrides a count input, and means connecting said reset means to the output from all of said output gates to reset said second counter whenever a pulse appears in a code combination at any of said outputs so that said second counter is not driven through a full count until after the transmission of a code combination has ceased.

2. The system defined in claim 1 wherein said means for combining pulses includes separate combining means for each pulse combination required, and an individual output terminal for each desired pulse combination representative of a separate information item, a plurality of selector switches, each of said selector switches having a plurality of input terminals, one of said plurality of input terminals being for each code combination generated by said system, and a single output terminal, means for connecting the same individual ones of said plurality of input terminals of all of said selector switches to individual ones of said code combination output terminals, and means for connecting the output terminals of said selector switches to selected input terminals so that each selector switch has at its output terminal a selected code combination.

3. The system defined in claim 1 wherein said first counter comprises a binary counter having four binary counter stages connected in cascade, and wherein said gate means comprises a plurality of coincidence gates, one such coincidence gate for each of the basic pulses required, said first counter outputs being connected to the inputs to said gates so that each count of said first counter passes a pulse through one of said gates, all of the pulses passing through said gates being of the same length and being so arranged in time that when one pulse decays another is created.

4. The system defined in claim 1 wherein said combining means comprises a plurality of OR gates, each of said OR gates having at least one input and being so arranged that it passes a pulse applied to any of its inputs, means connecting the inputs of one of the OR gates to combinations of outputs from said plurality of coincidence gates to produce at the output of said one OR gate a basic combination of pulse outputs from said coincidence gates, means for feeding the basic combination output from said one OR gate to an input of another OR gate together with the outputs from said coincidence gates to form a more complex combination of pulses from said basic combination, and means for so continuing the feedback and combination of pulses to form all of the desired pulse combinations needed to convey the required information.

5. An automatic system for generating electrical pulses in code combinations to represent any and all of a plurality of information items in any desired sequence, said system comprising a single oscillator for generating electrical pulses at a prescribed rate, means for creating from the output of said oscillator a train of pulses each of which is of the same width as said electrical pulses and which are arranged in timed sequence so that one pulse follows another without a break, a plurality of clock pulse terminals, means for connecting said creating means to said clock pulse terminals so that a single pulse of said sequence appears at each clock pulse terminal, a translator for organizing the pulses appearing at said clock pulse terminals into combinations of pulses of varying widths which individually represent the desired items of information, means for connecting the clock pulse terminals to said translator, said translator including a plurality of output code lines, and means for applying a single code combination to a single output code line.

6. The system defined in claim 5 further including a plurality of selector switches, each of said selector switches having an input terminal assigned to a single code combination, means for individually connecting the input terminals of the plurality of switches to the same corresponding output code lines from said translator so that all of said code combinations are simultaneously present at all of said plurality of switches, a single output means for each of said selector switches, and means for connecting said individual output means of each selector switch to a selected input terminal of that switch so that a selected code combination is available at the output means for each of said selector switches.

7. The system defined in claim 6 further including a code sequence switching device, said device comprising a second counter and a third counter, means for applying the output pulses from said oscillator to the input of said second counter to drive that counter through a count, said second counter including means for resetting the second counter to a prescribed count whenever a pulse appears at the resetting means, said resetting means overriding the effect of count input pulses to prevent said second counter from counting, means for connecting a prescribed count output of said second counter into the count input of said third counter, said third counter comprising a plurality of counter stages connected in cascade to provide a plurality of different count outputs, a plurality of output coincidence gates, one such output gate being provided for each of said selector switches, means for connecting the output means of each of said selector switches to an input of an individual output gate, means for connecting another input of each of said output gates to a unique count output of said third counter, and means for applying the outputs from said output gates to an output terminal and also to said reseet means for said second counter so that said second counter remains in its reset condition so long as an output pulse appears on the output of any output gate to cause the third counter to remain in a count until said output pulses cease when the input clock pulses applied to said second counter drive said second counter through its count to apply an input to said third counter to cause it to change count and so close the output gate which was open and open a subsequent output gate thereby causing the selected code combinations generated by said translator and selected by said selector switches to be transmitted from said output gate in sequence with appropriate spacing between code combinations.

8. The system defined in claim 7 further including an automatic output selector apparatus, said apparatus comprising a fourth timing counter having several counter stages connected in cascade, means for applying to the input of said fourth counter the pulses from said oscillator to drive said fourth counter through a complete count, at least three switching coincidence gates, means for connecting the inputs to one of said switching gates to a unique output from said fourth counter so that said one gate opens when the fourth counter reaches the unique count, means for connecting the output from said one switching gate directly to an input of a second switching gate and through an inverter to an input of a third switching gate so that when said one switching gate passes an output pulse said second switching gate is opened and said third switching gate is closed and when there is no output pulse from said one switching gate said second switching gate is closed and said third switching gate is open, means for applying the code combinations from said output gates to the inputs of said second and third switching gates to pass therethrough when said switching gates are open, and means for selectively opening said second switching gate regardless of the output from said one switching gate.

9. The system defined in claim 8 wherein said selectively opening means comprises means for switching an input to said second switching gate from the output of said one switching gate to a source of biasing potential.

10. The system defined in claim 9 further including output terminals connected to the outputs of said second and third switching gates, said output terminals serving as the code combination outputs from the entire system.

References Cited

UNITED STATES PATENTS

| | | | |
|---|---|---|---|
| Re. 26,079 | 9/1966 | Cooper | 340—348 |
| 2,771,600 | 11/1956 | Wright et al. | 340—365 |
| 3,021,516 | 2/1962 | Spitz et al. | 340—353 |
| 3,206,743 | 9/1965 | Nielsen | 340—353 |

THOMAS A. ROBINSON, Primary Examiner

U.S. Cl. X.R.

178—26